United States Patent [19]
Roberts

[11] Patent Number: 4,679,891
[45] Date of Patent: Jul. 14, 1987

[54] INFRA-RED LENSES
[75] Inventor: Michael Roberts, Clwyd, Wales
[73] Assignee: Pilkington P.E. Limited, United Kingdom
[21] Appl. No.: 752,370
[22] Filed: Jul. 3, 1985
[30] Foreign Application Priority Data
Jul. 14, 1984 [GB] United Kingdom ............... 8417993
[51] Int. Cl.⁴ .......................... G02F 1/02; G02B 9/12; G02B 9/34
[52] U.S. Cl. ....................................... 350/1.3; 350/1.4; 350/474
[58] Field of Search ................. 350/1.1, 1.3, 1.4, 474, 350/575

[56] References Cited
U.S. PATENT DOCUMENTS
4,505,535  3/1985  Neil ...................................... 350/1.3
FOREIGN PATENT DOCUMENTS
561503  8/1942  United Kingdom .
1559514 10/1976  United Kingdom .
2121211  6/1983  United Kingdom .

Primary Examiner—Bruce Y. Arnold
Attorney, Agent, or Firm—F. Eugene Davis IV

[57] ABSTRACT

An optically athermalized infra-red lens has a group of a least three closely spaced lens elements of different respective materials having positive thermal coefficients of refractive index. Two of the elements are of materials whose refractive indices are relatively temperature insensitive, one, e.g. of zinc selenide or chalcogenide glass, being positively powered and the other, e.g. of zinc sulphide, being negatively powered to effect achromatization and correct spherical aberration. The third element is negatively powered and of a relatively temperature senitive refractive index material, e.g. germanium, of lower dispersion and higher refractive index than the other two. The lens may be the objective of an afocal telescope having an eyepiece and associated scanner and detector arrangement and may effectively athermalize the whole system.

13 Claims, 10 Drawing Figures

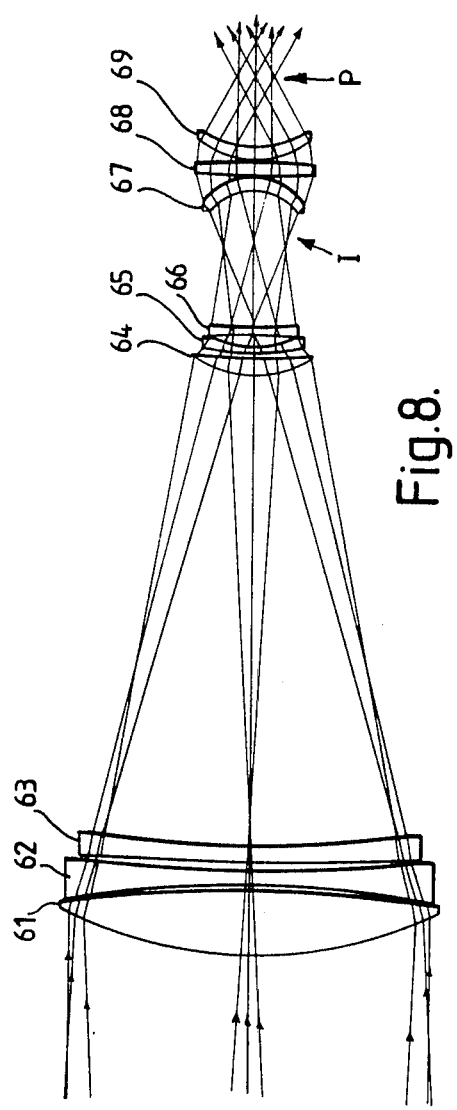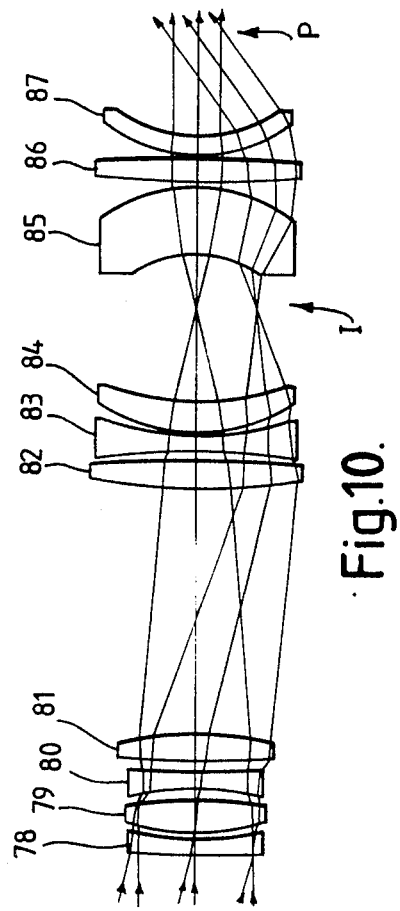

INFRA-RED LENSES

BACKGROUND OF THE INVENTION

This invention concerns inprovements in or relating to infra-red lenses.

Infra-red lenses can sometimes suffer from problems of thermal aberration which arise from the use of a material having a very high thermal coefficient of refractive index, i.e. the refractive index changes significantly with temperature. This occurs particularly with germanium which is commonly used in infra-red lenses, especially for the 8 to 12 micron wavelength range, and is an attractive material in view of its high index of refraction and its low dispersion. However, the high sensitivity to temperature of the refractive index of germanium can be troublesome by causing a degradation of image quality due mainly to a defocussing effect when the temperature changes.

It has previously been proposed to compensate for thermal effects by axial repositioning of one or more lens elements in the system. This can also allow for thermal effects other than just change in refractive index, for example change of lens element thickness and radii of curvature and change in dimensions of mounting devices resulting from expansion or contraction through temperature change, but such other effects generally tend to be of a considerably lower magnitude. An infra-red zoom lens with axially adjustable elements for overcoming the defocussing effect of temperature variations is disclosed in UK Patent Specification 1,559,514. Mechanical repositioning of one or more lens elements can in practice be achieved in several ways but generally tends to be complex and inconvenient and can sometimes result in an unwanted increase in the space occupied by or the mass of the overall lens system.

It has further previously been proposed to provide a substantially passively athermal infra-red lens system. UK Patent Application GB 2121211A discloses such a system having a primary and a secondary mounted in spaced apart relationship on a common support assembly and arranged so that thermal aberrations introduced by the primary and relative displacement of the primary and secondary caused by thermal expansion of the support assembly are compensated by thermal aberration introduced by a negatively powered lens of the secondary. It has also previously been proposed for visible light lenses to use a combination of different materials respectively having positive and negative coefficients of thermal aberration which balance. UK Patent Specification No. 561,503 discloses plastic lens elements possibly with glass lens elements arranged in combinations so that the coefficients of thermal aberration, in some cases with allowance for the mounting, balance by selection of respective materials with positive and negative coefficients of suitable magnitude. Unfortunately this approach is not readily applicable to infra-red lenses because of general lack of availability of suitable infra-red transmitting materials with large negative thermal coefficients of refractive index. Such infra-red transmitting materials with a negative coefficient as are available generally tend to have other objectionable properties which can render them unsuitable for some practical applications. It is therefore difficult to find suitable materials with a negative coefficient to balance those with a positive coefficient.

SUMMARY OF THE INVENTION

According to the present invention there is provided an infra-red lens having a group of at least three closely spaced lens elements, the group being of positive overall power and the three lens elements being of three different respective infra-red transmitting materials each having a positive thermal coefficient of refractive index, the group comprising a part of lens elements of materials whose refractive indices are relatively temperature insensitive, the pair consisting of a positively powered lens element and a negatively powered lens element arranged to effect substantial achromatisation and substantial correction of spherical aberration, and the group having a further negatively powered lens element of a material whose refractive index is relatively temperature sensitive and is of lower dispersion and higher refractive index than the materials of the said pair of elements, said further negatively powered lens element being arranged to effect substantial athermalisation. It is to be understood that a material is considered to have a positive thermal coefficient of refractive index if, at the relevant wavelengths, its refractive index increases when its temperature increases. Preferably for the 8 to 12 micron waveband the positively powered element of said pair is of zinc selenide or chalcogenide glass and the negatively powered element of said pair is of zinc sulphide while said further negatively powered lens element of the group is of germanium.

The positively powered lens element of said pair may be the front element of the group and may be of bi-convex shape, the negatively powered lens element of said pair may be the middle element of the group and may be of bi-concave shape, and said further negatively powered lens element may be the rear element of the group and may be of bi-concave shape. However the elements of the group need not necessarily be of these shapes and in this order and said further negatively powered lens element could, for example, be the front element of the group, or could be located as the middle element between the elements of said pair, and/or the negative element of said pair could be forward of the positive element. The group may have more than three lens elements and may in particular have a plurality of positively powered lens elements.

The lens may comprise one or more further lens elements. Said group may provide a front component or primary and a further one or more elements spaced rearwardly therefrom may provide a rear component or secondary, which may also be of positive power. The rear component may comprise for example a single lens element, which may for example be of meniscus shape convex to the front and may be of germanium, or it may as a further example comprise a plurality of lens elements of respective different materials which provide an athermalising effect. The front group and rear component may be carried on a common mounting. The terms 'front' and 'rear' are used in the sense that the front first receives incident infra-red radiation, i.e. in use faces towards the source. The substantial athermalisation may be of said group of at least three elements itself, or the group may be arranged to effect compensation for one or more other elements of the lens, such as a rear component and/or a mounting, so as to achieve substantial athermalisation of the overall lens, and/or may be arranged to effect compensation for one or more other members, such as a detection device, of a system in which the lens is employed so as to effect substantial athermalisation of the whole system.

The lens may be an objective lens for producing a real image of a scene or object from which radiation is received. Such image may be an external or final image formed for example at a detection device, or may be an internal or intermediate image in an optical system. It may, in particular, be an internal or intermediate image in a telescope and the present invention further provides an infra-red afocal telescope comprising an objective lens as set forth above in combination with an eye-piece or collimator lens which receives radiation from the image formed by the objective lens. The radiation emerging from the eye-piece or collimator lens may be scanned across an infra-red detector array in known manner. Said group of at least three elements in the objective lens may be arranged to compensate for the eye-piece or collimator lens, and/or for the scanner and/or detector array, so as to achieve substantial athermalisation of the telescope as a whole or the system as a whole. The eye-piece or collimator lens may be of any suitable form and may, for example, comprise three lens elements with the front element being of meniscus shape concave to the front, the middle element having a convex back surface, e.g. being of bi-convex shape or meniscus shape concave to the front, and the rear element being of meniscus shape convex to the front. The front element may be of positive or negative power, and the middle and rear elements are preferably positively powered. The material of the eye-piece or collimator lens elements is preferably germanium.

The refracting surfaces of all the lens elements are preferably all of spherical curvature but one or more aspheric surfaces could be employed if desired.

BRIEF DESCRIPTION OF THE DRAWINGS

Infra-red lenses and telescopes in accordance with the invention will now be described, by way of example, with reference to the accompanying drawings, in which:

FIGS. 4 to 10 are schematic representations of further embodiments of an afocal telescope having an objective lens.

DESCRIPTION OF THE PREFERRED EMBODIMENTS

Figure 1:
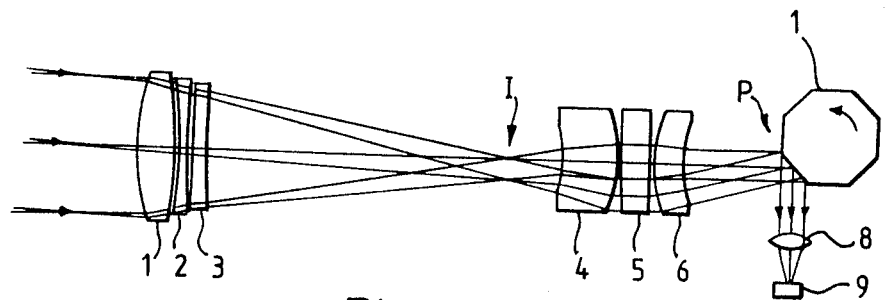
FIG. 1 is a schematic representation of a first embodiment of an afocal telescope having an objective lens.

The objective lens in the FIG. 1 embodiment consists of a group of three closely spaced lens elements 1, 2 and 3. The front element 1 is of positive power and of a first material having a positive thermal coefficient of refractive index but whose refractive index is relatively temperature insensitive. The middle element 2 of the group is of negative power and of a second material, different from the first, having a positive thermal coefficient of refractive index and whose refractive index is also relatively temperature insensitive. The elements 1 and 2 constitute a pair which, by virtue of the different materials with their respective refractive indices and dispersions, is arranged to effect substantial achromatisation and substantial correction of spherical aberration. The back element 3 of the group is a further negatively powered lens element. The element 3 is of a third material, different from the first and the second, having a positive thermal coefficient of refractive index but this third material has a refractive index which is relatively temperature sensitive. Also this third material has a lower dispersion and a higher refractive index than the first and second materials. The first, second and third materials are, of course, all infra-red transmitting materials having a useful spectral bandpass over the waveband in which the lens is to operate. This may be the 8 to 12 micron waveband or could alternatively be the 3 to 5 micron waveband. The element 3 is arranged to effect substantial athermalisation, and the relative powers of the elements 1, 2 and 3 are such as to give the group a required overall positive power. Preferred materials for the elements 1, 2 and 3 for the 8 to 12 micron waveband are zinc selenide, zinc sulphide and germanium respectively and the function of the group may be understood from the following explanation. Germanium has high refractive index and low dispersion but suffers from a high thermal coefficient of refractive index. If, therefore, in a positively powered lens germanium is replaced by some other material having a lower refractive index and a higher dispersion than germanium, then there will be a degradation with respect to spherical aberration and as regards chromatic defect. The spherical aberration can be minimised or eliminated by splitting power into more than one element (or by aspherising a surface) and the chromatic defect can be corrected by doubletising with two materials of different dispersion characteristics, one in a positively powered element and the other in a negatively powered element. Thus, an air spaced doublet formed by a positive element 1 of zinc selenide and a negative element 2 of zinc sulphide can provide good correction of both spherical and chromatic aberrations over the 8 to 12 micron bandwidth. Such a doublet, although considerably less temperature sensitive than a germanium singlet element, does not give complete athermalisation. The addition of a further negatively powered element 3 of germanium in the group, however, can achieve substantial athermalisation, and the overall positive power of the group can be maintained by increasing the overall power of the zinc selenide/zinc sulphide elements combination to allow for the negative germanium element. The germanium, being of relatively low dispersion, has a negligible effect on the chromatic correction provided by the zinc selenide/zinc sulphide pair. Further, since the germanium element 3 is of high refractive index the spherical aberration correction is not unduly adversely affected. However, substantial athermalisation is achieved by the highly temperature sensitive negative germanium element 3 causing a defocus effect of the correct direction and required amount to compensate for the thermal defocus due to the zinc selenide/zinc sulphide combination.

The objective lens consisting of the close spaced triplet lens group provided by elements 1, 2 and 3 in FIG. 1 receives collimated infra-red radiation from a distant scene or object and focusses it to form a real image I which is an internal or intermediate image in the telescope. Radiation from this image passes to a collimator or eye-piece lens comprising three closely spaced positively powered lens elements 4, 5 and 6 which, for the 8 to 12 micron waveband, are preferably of germanium. The collimated radiation from the eye-piece lens travels to an exit pupil P at which a scanner 7 operates in known manner to scan the radiation via a focussing lens 8 across an infra-red detector array 9.

The thermal defocussing effect of the back element 3 of the objective lens group may, instead of compensating just for the pair of elements 1 and 2 so as to athermalise the group alone, overcompensate with respect to the pair of elements 1 and 2 so as to athermalise the entire telescope, or the whole system including the scanning and detector members. It will further be understood that optical correction in the telescope may to some extent be shared between the objective and eye-piece lenses so that, for example, aberrations introduced by the objective may be at least partially corrected or compensated for in the eye-piece, or the objective may be arranged to correct or compensate for aberrations introduced by the eye-piece. In the FIG. 1 embodiment the element 1 is bi-convex, the element 2 is bi-concave and so is the element 3. The lens element 4 is meniscus concave to the front, the element 5 is bi-convex and the element 6 is meniscus convex to the front.

A particular example in accordance with this embodiment for operation in the 8 to 12 micron waveband has numerical data as follows, the refracting surfaces being identified from front to back as R1 to R12 and being all of spherical curvature. R13 indicates the exit pupil. The lens elements are air spaced. The dimensional units are millimeters but the values are relative and can be scaled accordingly. Element 1 is of zinc selenide, element 2 is of zinc sulphide and the other lens elements 3, 4, 5 and 6 are of germanium, the relevant properties of these materials being approximately as indicated.

EXAMPLE I

| Element | Surface | Radius of Curvature | Axial Thickness or Separation |
| --- | --- | --- | --- |
| 1 | R1 | 51.653 | 9.121 |
|   | R2 | −108.661 | 0.576 |
| 2 | R3 | −98.131 | 2.058 |
|   | R4 | 284.044 | 1.473 |
| 3 | R5 | −501.302 | 3.448 |
|   | R6 | 290.989 | 82.206 |
| 4 | R7 | −24.235 | 12.557 |
|   | R8 | −31.568 | 0.811 |
| 5 | R9 | 319.160 | 6.897 |
|   | R10 | −1164.520 | 0.811 |
| 6 | R11 | 29.420 | 6.694 |
|   | R12 | 29.373 | 24.130 |
| P | R13 | PLANO |   |

|   | Refractive Index (20° C.) (10 microns) | V Value (8–12 microns) | Temperature Coefficient of Refractive Index × $10^6$/°C. |
| --- | --- | --- | --- |
| Zinc Selenide | 2.40655 | 57.882 | 60 |
| Zinc Sulphide | 2.20020 | 22.731 | 50 |
| Geranium | 4.00324 | 868.006 | 396 |

Figure 2:
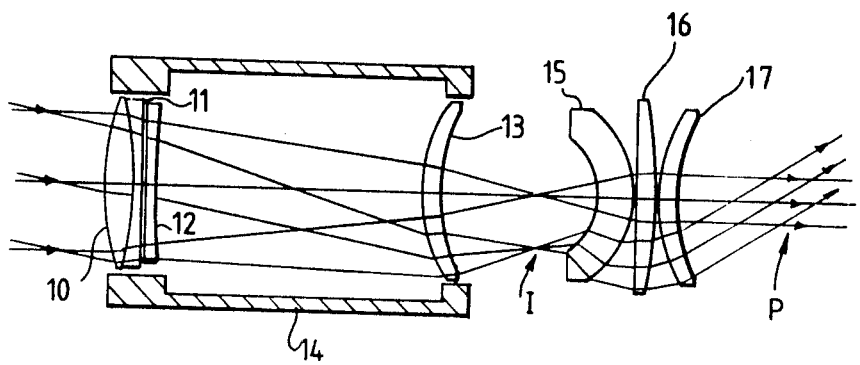
FIG. 2 is a schematic representation of a second embodiment of an afocal telescope having an objective lens.

The embodiment of telescope shown in FIG. 2 has an objective lens with a front group of elements 10, 11 and 12 and a rear component consisting of a single element 13 spaced rearwardly from the front group. The front group 10, 11 and 12 or primary and the rear component 13 or secondary are carried on a common mounting 14 of, for example, aluminium.

The elements 10, 11 and 12 are closely spaced and of different materials as previously described, this group corresponding to that formed by elements 1, 2 and 3 in the FIG. 1 embodiment. The rear element 13 of this objective lens is positively powered and assists in focussing collimated radiation from a distant scene or object to form the intermediate image I. The eye-piece or collimator lens in the FIG. 2 embodiment consists of three closely spaced elements 15, 16 and 17. For convenience the scanner and detector arrangement is not shown in FIG. 2 but is similar to that shown schematically in FIG. 1.

In the FIG. 2 embodiment the positive element 10 is bi-convex, the negative element 11 is bi-concave and the negative element 12 is bi-concave. The rear objective element 13 is meniscus convex to the front. The front element 15 of the eye-piece is a negatively powered meniscus concave to the front. The middle element 16 is also meniscus concave to the front but is positively powered, and the back element 17 is meniscus convex to the front and positively powered.

The thermal defocussing effect of the back element 12 of the front group may be such as substantially to athermalise the whole objective lens with its rear element 13 and mounting 14, or such as substantially to athermalise the entire telescope or the whole system. Optical correction in the telescope may be shared between the objective and eye-piece lenses as already mentioned in relation to the FIG. 1 embodiment.

The lens elements are all, of course, transmissive to infra-red radiation in the waveband over which the telescope is to operate and for the 8 to 12 micron waveband preferably the element 10 is of zinc selenide, the element 11 is of zinc sulphide and the elements 12, 13, 15, 16 and 17 are of germanium. A particular example in accordance with the FIG. 2 embodiment and employing air spaced elements of these materials with relevant properties approximately as given above under Example I has numerical data as follows. The refracting surfaces, which are all of spherical curvature, are identified from front to back as R1 to R14 with R15 for the exit pupil and the dimensional units are millimeters (but the values are relative and can be scaled accordingly).

EXAMPLE II

| Element | Surface | Radius of Curvature | Axial Thickness or Separation |
| --- | --- | --- | --- |
| 10 | R1 | 57.969 | 6.248 |
|   | R2 | −86.627 | 0.361 |
| 11 | R3 | −79.287 | 1.905 |
|   | R4 | 1283.650 | 1.016 |
| 12 | R5 | −724.062 | 2.159 |
|   | R6 | 199.152 | 61.713 |
| 13 | R7 | 35.920 | 4.191 |
|   | R8 | 41.178 | 36.761 |
| 15 | R9 | −16.254 | 8.409 |
|   | R10 | −23.352 | 0.508 |
| 16 | R11 | −649.186 | 4.318 |
|   | R12 | −126.366 | 0.508 |
| 17 | R13 | 34.399 | 4.191 |
|   | R14 | 38.315 | 23.368 |
| P | R15 | PLANO |   |

The coefficients of thermal expansion of the optical materials and of the mechanical material of the mounting or support in Examples I and II are approximately as follows:

|   | Temperature Coefficient of Linear Expansion × $10^7$/°C. |
| --- | --- |
| Zinc Selenide | 76 |
| Zinc Sulphide | 79 |
| Germanium | 61 |

-continued

| | Temperature Coefficient of Linear Expansion × $10^7$/°C. |
|---|---|
| Aluminum | 230 |

Example I provides a ×4.5 magnification and has a total field of view of 30° at the exit pupil which is of 7.1 mm diameter, while Example II provides a ×3.0 magnification and has a total field of view of 64° at the exit pupil which is of 10.5 mm diameter.

It will be seen from the foregoing that the present invention is especially useful in providing infra-red afocal telescopes. Although more suited to relatively low magnification, for example in the range of about ×2 to ×6, the objective part can of course be scaled to suit other magnifications. It will be understood, however, that an objective lens in accordance with the invention could be used otherwise than in a telescope, and could be an imaging lens for forming a real image for example at an external image surface on a suitable detection device. The objective lens would then be adequately optically corrected itself and the athermalisation may be of the group, particularly if that provides the only lens elements in the objective (like in the objective of the FIG. 1 embodiment), or of the group and any rear component possibly with a common mounting, or of the whole system with detection device.

Where the lens includes a rear component spaced from the front group, that rear component could have more than one lens element. A single element of low dispersion material (as in the objective lens of the FIG. 2 embodiment) is however often preferable since it usually has less effect on off-axis performance, in particular with respect to lateral chromatic aberration.

It will be appreciated that the particular shapes and arrangement of lens elements in the embodiments of FIGS. 1 and 2 represent particular designs and that other suitable shapes and/or arrangements might be employed. In particular it will be understood that at least some of the benefits of the invention may be achieved, and its scope is not avoided, by including one or possibly more further lens elements in the group, for example by effectively splitting one or more of the recited three elements of the group. Also, the lens elements of the group may be arranged in any suitable order; for example the negatively powered germanium element could be the front element of the group, or could be the middle element since the elements of said pair need not necessarily be adjacent elements, and/or the negative element of the pair could be located forwardly of the positive element of the pair. It will further be understood that in telescope embodiments any suitable form of eye-piece or collimator lens may be employed, the particular forms used in the FIGS. 1 and 2 embodiments being particular versions given by way of example. Yet further it will be understood that the materials of the lens elements may be other than the ones specifically described and preferred for the 8 to 12 micron waveband, and that they can be selected to suit the particular operational waveband which may alternatively be 3 to 5 microns. Also the solid lens elements could be spaced by a gas other than air, although air is usually convenient.

Further embodiments in accordance with the invention and illustrating some of the possibilities mentioned above are schematically shown in FIGS. 3 to 10.

Figure 3:
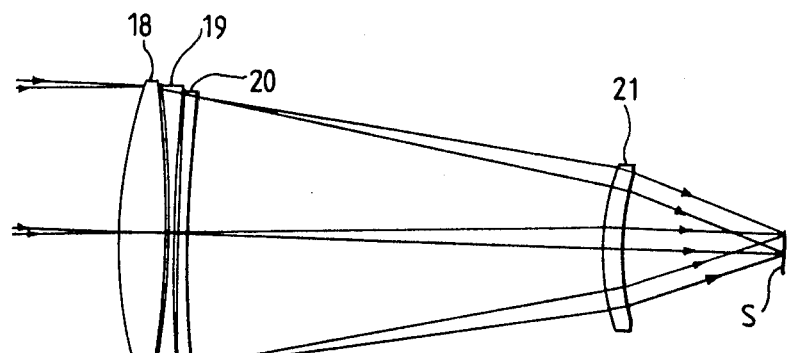
FIG. 3 is a schematic representation of an embodiment of an imaging lens.

FIG. 3 illustrates application of the invention to an infra-red objective lens which constitutes an imaging lens for forming a real image at an external image surface S on a suitable detection device. This imaging lens is of generally similar construction to the objective lens of FIG. 2, and comprises a positive front group consisting of three closely spaced lens elements 18, 19 and 20 and a rear component consisting of a single element 21 spaced rearwardly from the front group. In the front group the front element 18 is a positive bi-convex element of zinc selenide, the middle element 19 is a negative bi-concave element of zinc sulphide, and the back element 20 is a negative meniscus element convex to the front of germanium. The rear component single element 21 is a positive meniscus element convex to the front of germanium.

A particular example in accordance with the FIG. 3 embodiment with air spaced elements has numerical data as follows (expressed on the same basis as the previous examples):

EXAMPLE III

| Element | Surface | Radius of Curvature | Axial Thickness or Separation |
|---|---|---|---|
| 18 | R1 | 51.333 | 5.334 |
| | R2 | −119.997 | 0.254 |
| 19 | R3 | −110.612 | 0.965 |
| | R4 | 233.421 | 0.381 |
| 20 | R5 | 558.426 | 1.016 |
| | R6 | 145.333 | 49.125 |
| 21 | R7 | 26.323 | 2.286 |
| | R8 | 30.835 | 19.119 |
| S | R9 | PLANO | |

FIGS. 4 to 10 illustrate further embodiments of afocal infra-red telescopes in accordance with the invention, and the examples relating thereto are expressed on the same basis as previously.

Figure 4:
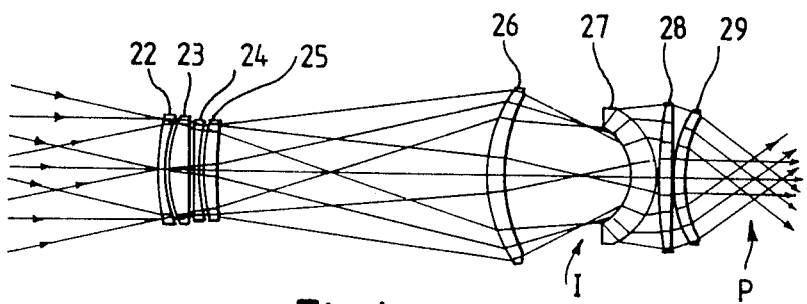

The FIG. 4 embodiment is generally similar to that of FIG. 2 but the positive front group in FIG. 4 has four closely spaced lens elements 22, 23, 24 and 25 as against the three elements of FIG. 2, and the order of the elements is different. In FIG. 4 the front element 22 is a negative meniscus convex to the front of zinc sulphide, the next element 23 is a positive meniscus (almost convex-plano) convex to the front of zinc selenide, the next element 24 is a negative meniscus convex to the front of germanium, and the back element 25 of the front group is a positive meniscus convex to the front also of germanium. The objective lens part of the telescope has a rear component consisting of a single positive meniscus element 26 convex to the front of germanium. The eye-piece lens has three closely spaced elements, all of germanium, the front element 27 being a negative meniscus concave to the front, the middle element 28 being a positive meniscus convex to the front, and the back element 29 being a more steeply curved positive meniscus convex to the front. The elements are air spaced. A particular example according to FIG. 4 has numerical data as follows:

EXAMPLE IV

| Element | Surface | Radius of Curvature | Axial Thickness or Separation |
|---|---|---|---|
| 22 | R1 | 67.432 | 2.077 |
| | R2 | 38.060 | 1.206 |
| 23 | R3 | 40.231 | 7.112 |

-continued

| Element | Surface | Radius of Curvature | Axial Thickness or Separation |
|---|---|---|---|
|  | R4 | 2425.052 | 1.277 |
| 24 | R5 | 470.431 | 2.032 |
|  | R6 | 66.369 | 1.184 |
| 25 | R7 | 80.723 | 4.572 |
|  | R8 | 185.203 | 91.195 |
| 26 | R9 | 50.406 | 6.244 |
|  | R10 | 66.369 | 41.981 |
| 27 | R11 | −17.460 | 8.227 |
|  | R12 | −24.511 | 0.508 |
| 28 | R13 | 156.516 | 4.318 |
|  | R14 | 1486.597 | 0.508 |
| 29 | R15 | 39.733 | 4.191 |
|  | R16 | 45.581 | 23.368 |
| P | R17 | PLANO |  |

Example IV provides a ×3 magnification and has a total field of view of 72° at the exit pupil which is of 11.1 mm diameter.

Relative to the FIG. 2 embodiment, the front group of FIG. 4 may be considered as having the negative germanium element split into two elements, one negative and one positive, so as to provide a four element front group, and in FIG. 4 the negative zinc sulphide element is at the front and the positive zinc selenide element in the middle.

Figure 5:
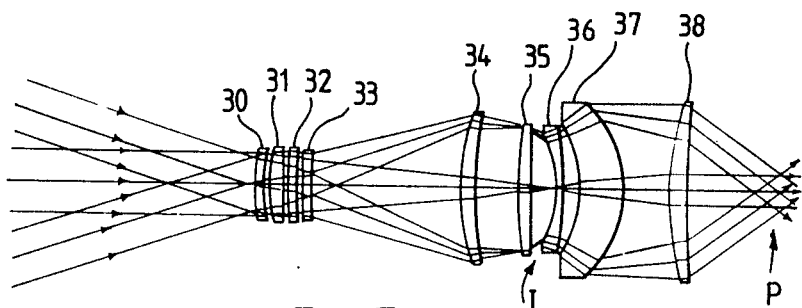

FIG. 5 has a similar positive front component with four closely spaced lens elements. The front element 30 is a negative meniscus convex to the front of zinc sulphide, the next element 31 is a positive bi-convex element of zinc selenide, the next element 32 is a positive meniscus convex to the front of germanium, and the back element 33 of the group is a negative bi-concave (almost plano-concave) element also of germanium. The telescope objective lens has a rear component consisting of a positive meniscus element 34 convex to the front, and there is a bi-convex positive field lens element 35 close to the intermediate image I (and which may therefore be considered as associated with the eyepiece). The eyepiece lens has a front element 36 which is a negative meniscus concave to the front, a relatively thick positive meniscus element 37 concave to the front and a positive meniscus element 38 convex to the front. All the elements 34 to 38 are of germanium. The solid lens elements are air spaced. A particular example according to FIG. 5 has numerical data as follows:

EXAMPLE V

| Element | Surface | Radius of Curvature | Axial Thickness or Separation |
|---|---|---|---|
| 30 | R1 | 69.566 | 2.700 |
|  | R2 | 40.009 | 2.000 |
| 31 | R3 | 47.187 | 5.160 |
|  | R4 | −541.393 | 1.000 |
| 32 | R5 | 122.634 | 3.300 |
|  | R6 | 233.709 | 2.000 |
| 33 | R7 | −4025.995 | 2.800 |
|  | R8 | 112.692 | 49.520 |
| 34 | R9 | 67.254 | 4.500 |
|  | R10 | 102.641 | 14.930 |
| 35 | R11 | 153.753 | 4.500 |
|  | R12 | −678.437 | 8.620 |
| 36 | R13 | −34.065 | 2.540 |
|  | R14 | −108.308 | 5.000 |
| 37 | R15 | −38.606 | 14.650 |
|  | R16 | −37.513 | 15.470 |
| 38 | R17 | 96.510 | 5.350 |
|  | R18 | 305.310 | 31.540 |

-continued

| Element | Surface | Radius of Curvature | Axial Thickness or Separation |
|---|---|---|---|
| P | R19 | PLANO |  |

Example V provides a ×2.04 magnification and has a total field of view of 72° at the exit pupil which is of 10 mm diameter.

Figure 6:
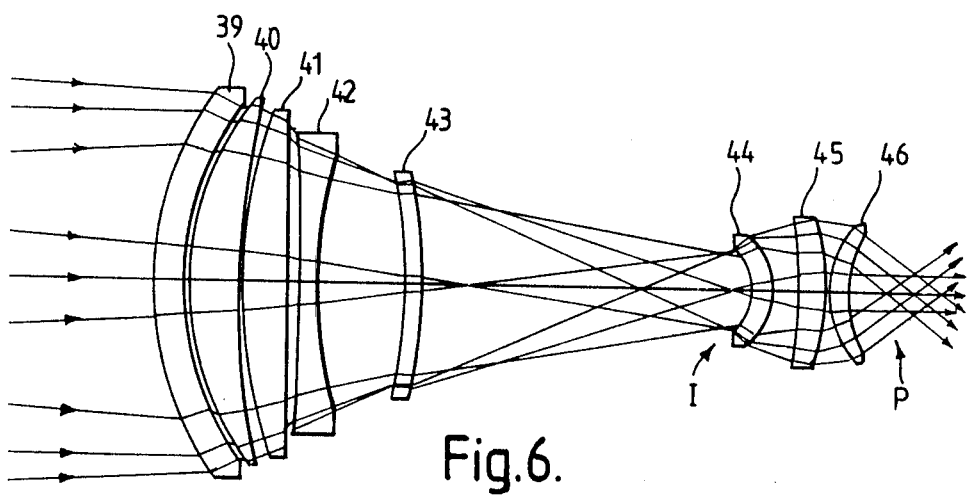

The FIG. 6 embodiment also has a four element positive front group but with a germanium element at the front and with two elements of zinc selenide. In this embodiment, therefore, the front group consists of a front negative meniscus element 39 convex to the front of germanium, then a positive meniscus element 40 convex to the front of zinc selenide, then a positive bi-convex (almost convex-plano) element 41 also of zinc selenide, and then a back negative element 42 which is bi-concave (almost plano-concave) and of zinc sulphide. These four elements are closely spaced and the objective lens has a rear component consisting of a single negative meniscus element 43 concave to the front of germanium. The eyepiece lens consists of three germanium elements, the front element 44 being a positive meniscus concave to the front, the middle element 45 being a positive meniscus concave to the front, and the back element 46 being a positive meniscus convex to the front. The elements are air spaced. A particular example according to FIG. 6 has numerical data as follows:

EXAMPLE VI

| Element | Surface | Radius of Curvature | Axial Thickness or Separation |
|---|---|---|---|
| 39 | R1 | 105.807 | 8.139 |
|  | R2 | 87.616 | 3.662 |
| 40 | R3 | 93.719 | 15.218 |
|  | R4 | 240.157 | 1.000 |
| 41 | R5 | 148.182 | 15.734 |
|  | R6 | −6037.556 | 3.210 |
| 42 | R7 | −976.397 | 5.835 |
|  | R8 | 125.061 | 30.153 |
| 43 | R9 | −145.601 | 5.376 |
|  | R10 | −157.813 | 110.403 |
| 44 | R11 | −16.756 | 6.699 |
|  | R12 | −21.718 | 8.978 |
| 45 | R13 | −114.590 | 9.054 |
|  | R14 | −72.804 | 1.000 |
| 46 | R15 | 30.907 | 5.588 |
|  | R16 | 33.505 | 23.114 |
| P | R17 | PLANO |  |

Example VI provides a ×10 magnification and has a total field of view of 72° at the exit pupil which has a diameter of 11.1 mm.

It will be seen that, relative to the FIG. 2 embodiment, the front group of FIG. 6 has the three different materials in a different order, i.e. with the germanium at the front and the zinc sulphide at the back, and the zinc selenide in the middle is effectively split into two positive elements.

Figure 7:
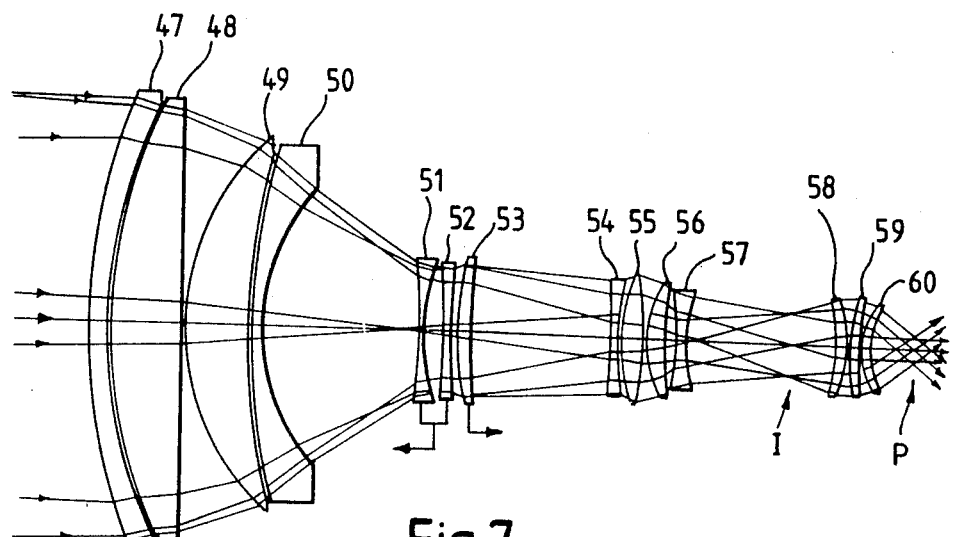

The FIG. 7 embodiment has a front positive lens group generally similar to that of FIG. 6 and with the different materials in the same order. Thus in FIG. 7 the front element is a negative meniscus element 47 convex to the front of germanium, there are then two positive elements of zinc selenide the front one 48 being convex-plano and the back one 49 being meniscus convex to the front, and the back element 50 of the group being a negative meniscus convex to the front of zinc sulphide.

The FIG. 7 embodiment is a zoom lens and behind the front group are zoom components which operate in well known manner to vary the magnification of the telescope, there being a front zoom component having a front negative bi-concave element 51 of zinc selenide and a back negative bi-concave (almost plano-concave) element 52 of germanium, and a back zoom component consisting of a single positive meniscus element 53 convex to the front of germanium. These zoom components are moveable relatively to each other and to other components of the overall lens. Behind the zoom components is a rear component comprising four closely spaced lens elements of three different materials arranged in the same order as in the front group. Thus the rear component or group has a front negative bi-concave element 54 of germanium, then two positive elements of zinc selenide the front one 55 being bi-convex and the back one 56 being meniscus convex to the front, and then a back element 57 of zinc sulphide which is a negative bi-concave element. This rear group effects athermalisation as previously described. The eyepiece lens consists of three germanium elements, the front one 58 being a positive meniscus concave to the front, the middle one 59 being a positive meniscus convex to the front, and the back one 60 being a more steeply curved positive meniscus convex to the front. The lens elements are air spaced. A particular example in accordance with the FIG. 7 embodiment has numerical data as follows:

| Element | Surface | Radius of Curvature | Axial Thickness or Separation |
|---|---|---|---|
| 47 | R1 | 301.648 | 8.614 |
|  | R2 | 230.789 | 1.554 |
| 48 | R3 | 238.637 | 36.292 |
|  | R4 | PLANO | 1.378 |
| 49 | R5 | 119.465 | 33.812 |
|  | R6 | 342.018 | 1.031 |
| 50 | R7 | 346.720 | 5.409 |
|  | R8 | 97.445 | VARIABLE |
| 51 | R9 | −572.420 | 3.292 |
|  | R10 | 116.609 | 9.035 |
| 52 | R11 | −1129.742 | 3.810 |
|  | R12 | 359.743 | VARIABLE |
| 53 | R13 | 138.964 | 6.096 |
|  | R14 | 306.834 | VARIABLE |
| 54 | R15 | −605.122 | 4.572 |
|  | R16 | 192.726 | 1.016 |
| 55 | R17 | 90.191 | 11.842 |
|  | R18 | −188.912 | 1.016 |
| 59 | R19 | 52.599 | 9.652 |
|  | R20 | 182.777 | 5.748 |
| 57 | R21 | −147.904 | 4.826 |
|  | R22 | 58.383 | 79.007 |
| 58 | R23 | −63.259 | 5.444 |
|  | R24 | −56.014 | 1.016 |
| 59 | R25 | 112.896 | 4.445 |
|  | R26 | 228.615 | 1.016 |
| 60 | R27 | 33.438 | 4.953 |
|  | R28 | 35.308 | 23.114 |
| P | R29 | PLANO |  |

The axial separations indicated as variable depend on the zoom setting of the lens, the magnification being variable between ×3.5 and ×20 by reason of the zoom facility.

The variable air gaps have values as follows at the indicated magnification settings:

| Magnification | R8-R9 | R12-R13 | R14-R15 |
|---|---|---|---|
| X 3.5 | 48.414 | 102.238 | 8.795 |
| X 9.0 | 71.370 | 53.489 | 34.588 |
| X14.5 | 77.606 | 24.891 | 56.949 |
| X20.0 | 81.277 | 3.809 | 74.361 |

In FIG. 7 the zoom lens elements are shown at their ×20 magnification setting positions and Example VII has a total field of view of 72° at the exit pupil which has a diameter of 11.1 mm.

The FIG. 7 embodiment illustrates the applicability of the invention to a zoom lens system, and also that an objective lens according to the invention may have both front and rear components provided by athermalising groups of closely spaced elements of different materials as proposed by the invention. In FIG. 7 the front and rear components each have four lens elements with the different materials in the same order, i.e. with germanium at the front, zinc sulphide at the back, and zinc selenide (two elements) in the middle.

The FIG. 8 embodiment also has front and rear components formed by groups of elements of different materials in accordance with the invention, but in FIG. 8 each group has only three lens elements and the order of the materials, which is the same in both groups, is different from that in FIG. 7. The FIG. 8 embodiment, which is not a zoom lens, has a front group of three closely spaced lens elements of which the front element 61 is a positive bi-convex element of zinc selenide, the middle element 62 is a negative bi-concave element of zinc sulphide, and the back element 63 is a negative meniscus convex to the front of germanium. The rear group of the objective lens has three closely spaced elements of which the front elements 64 is a positive meniscus convex to the front of zinc selenide, the middle element 65 is a negative meniscus convex to the front of zinc sulphide, and the back element 66 is a negative bi-concave element of germanium. The eyepiece lens consists of three germanium elements of which the front one 67 is a negative meniscus concave to the front, the middle one 68 is a positive bi-convex element, and the back one 69 is a positive meniscus convex to the front. The lens elements are air spaced. A particular example according to FIG. 8 has numerical data as follows:

EXAMPLE VIII

| Element | Surface | Radius of Curvature | Axial Thickness or Separation |
|---|---|---|---|
|  | R1 | 142.903 | 21.336 |
|  | R2 | −441.165 | 1.201 |
| 62 | R3 | −375.348 | 4.826 |
|  | R4 | 547.051 | 2.540 |
| 63 | R5 | 975.581 | 5.080 |
|  | R6 | 389.613 | 152.448 |
| 64 | R7 | 39.274 | 5.080 |
|  | R8 | 188.963 | 1.524 |
| 65 | R9 | 69.497 | 2.295 |
|  | R10 | 35.675 | 3.810 |
| 66 | R11 | −262.751 | 2.305 |
|  | R12 | 191.661 | 44.553 |
| 67 | R13 | −18.407 | 4.136 |
|  | R14 | −21.208 | 0.508 |
| 68 | R15 | 769.113 | 4.318 |
|  | R16 | −172.364 | 0.508 |
| 69 | R17 | 29.842 | 4.191 |
|  | R18 | 32.222 | 23.368 |
| P | R19 | PLANO |  |

Example VIII provides a magnification of ×10.9 and has a total field of view of 72° at the exit pupil which has a diameter of 11.1 mm.

The preceding examples use zinc selenide with zinc sulphide and germanium as the three different materials in the group. The embodiments of FIGS. 9 and 10 illustrate the use of other materials, and FIG. 9 further illustrates that the group may have more than four lens elements.

Figure 9:
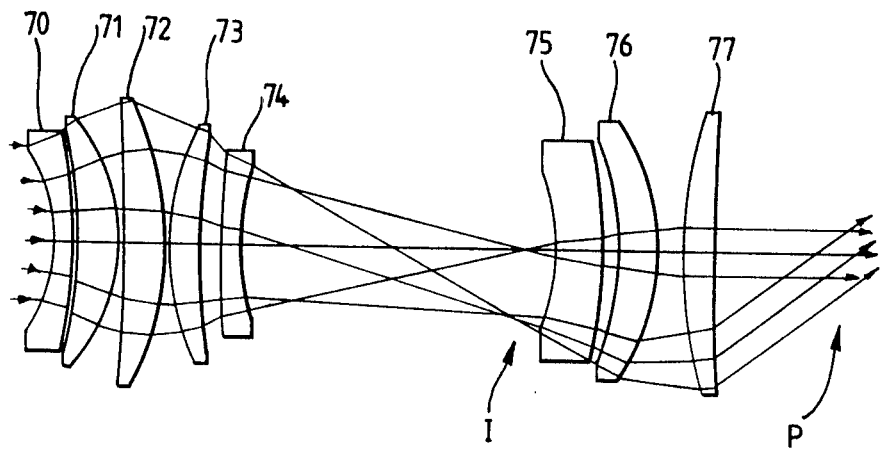

In FIG. 9 the objective lens has only the one component consisting of a positive group of five closely spaced lens elements. The front element 70 is a negative meniscus concave to the front of germanium, and the back element 74 is a negative meniscus convex to the front of zinc sulphide. Between these are three positive meniscus lens elements of BS1 (Barr & Stroud) chalcogenide glass, the front and middle elements 71 and 72 of the three being concave to the front and the back element 73 being concave to the rear. The eyepiece lens has three elements of which the front element 75 is a negative meniscus concave to the front of zinc sulphide, the middle element 76 is a positive meniscus concave to the front of germanium, and the back element 77 is a positive meniscus convex to the front also of germanium. The lens elements are air spaced. A particular example according to FIG. 9 has numerical data as follows:

EXAMPLE IX

| Element | Surface | Radius of Curvature | Axial Thickness or Separation |
|---------|---------|---------------------|-------------------------------|
|         | R1      | −37.052             | 4.177                         |
|         | R2      | −122.208            | 1.436                         |
| 71      | R3      | −104.540            | 9.646                         |
|         | R4      | −41.704             | 0.928                         |
| 72      | R5      | −679.871            | 9.755                         |
|         | R6      | −71.207             | 0.928                         |
| 73      | R7      | 56.722              | 7.215                         |
|         | R8      | 142.122             | 5.252                         |
| 74      | R9      | 271.634             | 4.409                         |
|         | R10     | 56.683              | 74.348                        |
| 75      | R11     | −44.884             | 10.391                        |
|         | R12     | −115.346            | 4.081                         |
| 76      | R13     | −66.847             | 8.792                         |
|         | R14     | −50.272             | 5.948                         |
| 77      | R15     | 102.652             | 6.967                         |
|         | R16     | 433.100             | 33.726                        |
| P       | R17     | PLANO               |                               |

Example IX provides a magnification of ×2.4 and has a total field of view of 72° at the exit pupil which has a diameter of 11.1 mm. The athermalisation includes a significant amount of over-compensation to allow for the otherwise uncorrected thermal effects in the scanner, the example being designed specifically for operation with a scanner having a dog-leg detector mount which requires compensation of 0.013 dioptres per degree Kelvin.

The embodiment of FIG. 10 has a front objective component formed by a positive group of four closely spaced lens elements. The front element 78 is a negative meniscus convex to the front of zinc sulphide, the next is a positive bi-convex element 79 of IRG 100 (Schott) chalcogenide glass, the next is a negative bi-concave element 80 of germanium, and the back element 81 of the group is a positive bi-convex element of IRG 100 chalcogenide glass. This illustrates that two elements of the same material in the group may be separated by an element of a different material. The objective lens has a rear component formed by three lens elements of which the front element 82 is a positive bi-convex element of germanium, the middle element 83 is a negative bi-concave element of BS1 chalcogenide glass, and the back element 84 is a positive meniscus convex to the front of germanium. The eyepiece lens consists of three germanium elements of which the front one 85 is a relatively thick negative meniscus concave to the front, the middle one 86 is a positive bi-convex element, and the back one 87 is a positive meniscus convex to the front. The elements are air spaced. A particular example according to FIG. 10 has numerical data as follows:

EXAMPLE X

| Element | Surface | Radius of Curvature | Axial Thickness or Separation |
|---------|---------|---------------------|-------------------------------|
|         | R1      | 349.935             | 3.810                         |
|         | R2      | 73.867              | 1.325                         |
| 79      | R3      | 51.535              | 7.620                         |
|         | R4      | −104.278            | 2.540                         |
| 80      | R5      | −60.317             | 3.709                         |
|         | R6      | 364.654             | 2.540                         |
| 81      | R7      | 216.119             | 6.096                         |
|         | R8      | −85.923             | 55.910                        |
| 82      | R9      | 140.269             | 6.350                         |
|         | R10     | −403.072            | 2.286                         |
| 83      | R11     | −137.377            | 3.302                         |
|         | R12     | 68.572              | 1.139                         |
| 84      | R13     | 46.325              | 6.244                         |
|         | R14     | 63.984              | 33.595                        |
| 85      | R15     | −25.062             | 14.889                        |
|         | R16     | −37.247             | 1.016                         |
| 86      | R17     | 274.844             | 5.080                         |
|         | R18     | −761.140            | 1.016                         |
| 87      | R19     | 35.374              | 5.080                         |
|         | R20     | 39.599              | 22.788                        |
| P       | R21     | PLANO               |                               |

Example X provides a magnification of ×2.4 and has a total field of view of 72° at the exit pupil which has a diameter of 11.1 mm.

It will be understood that with a telescope the design can be athermalised for the telescope alone or over-althermalised to compensate for the scanner and, in either case, the athermalisation may be to maintain focus only if magnification variations are acceptable, or may be to maintain both focus and magnification. Example X is over-compensated to allow for the scanner and is athermalised for both focus and magnification. To this end the objective rear component, i.e. the group of elements 82, 83 and 84, is of overall positive power but this power increases with temperature in order to satisfy the first order conditions. The positive elements 82 and 84 are therefore of germanium whereas in the front group, in accordance with the invention, the negative element 80 is of germanium. The objective rear component is not fully corrected for transverse chromatic aberration but this is generally acceptable.

The chalcogenide glasses used in Examples IX and X have relevant properties as follows:

|      | Refractive Index (20° C.) (10 microns) | V Value (8–12 microns) |
|------|----------------------------------------|------------------------|
| BS1  | 2.4914                                 | 119.3                  |
| IRG 100 | 2.6002                              | 103.2                  |

|      | Temperature Coefficient of Refractive Index × $10^6$/°C. | Temperature Coefficient of Linear Expansion × $10^7$/°C. |
|------|-----------------------------------------------------------|-----------------------------------------------------------|
| BS1  | 70                                                        | 128                                                       |

| | | |
|---|---|---|
| -continued | | |
| IRG 100 | 56 | 150 |

It will be appreciated that these specific materials are illustrative and other suitable materials having a positive thermal coefficient of refractive index could be employed. In general it is desirable that, considering the basic three element group, the positive element should have a thermal coefficient of refractive index divided by its V value which gives an as small as possible positive factor. The V value should preferably be high, e.g. greater than 50 for 8 to 12 microns, since the higher the V value the lower the power that is needed. The negative element of relatively temperature insensitive refractive index should preferably have high dispersion and low V value while the other negative element of relatively temperature sensitive refractive index should preferably have low dispersion and high V value. As indicated previously, however, the group may have more than three elements.

I claim:

1. An infra-red lens having a group of at least three closely spaced lens elements, the group being of positive overall power and the three lens elements being of three different respective infra-red transmitting materials each having a positive thermal coefficient of refractive index, the group comprising a pair of lens elements of materials whose refractive indices are relatively temperature insensitive, the pair consisting of a positively powered lens element and a negatively powered lens element arranged to effect substantial achromatisation and substantial correction of spherical aberration, and the group having a further negatively powered lens element of a material whose refractive index is relatively temperature sensitive and is of lower dispersion and higher refractive index than the materials of the said pair of elements, said further negatively powered lens element being arranged to effect substantial athermalisation.

2. A lens according to claim 1 in which said further negatively powered lens element of the group is of germanium.

3. A lens according to claim 1 in which the negatively powered element of said pair is of zinc sulphide.

4. A lens according to claim 1 in which the positively powered element of said pair is of zinc selenide.

5. A lens according to claim 1 in which the positively powered element of said pair is of chalcogenide glass.

6. A lens according to claim 1 in which said group has more than three lens elements.

7. A lens according to claim 6 in which said group has a plurality of positively powered lens elements.

8. A lens according to claim 1 in which said group provides a front component and has a rear component spaced rearwardly therefrom.

9. A lens according to claim 8 in which said rear component comprises a plurality of lens elements of respective different materials which provide an athermalising effect.

10. A lens according to claim 1 in which the negatively powered element of said pair is of zinc sulphide and said further negatively powered lens element of the group is of germanium.

11. A lens according to claim 10 in which the positively powered element of said pair is of zinc selenide.

12. A lens according to claim 10 in which the positively powered element of said pair is of chalcogenide glass.

13. An infra-red afocal telescope comprising an objective lens according to claim 1 for producing a real image in combination with an eye-piece lens which receives radiation from that image.

* * * * *